United States Patent [19]
Wilson

[11] Patent Number: 5,502,937
[45] Date of Patent: Apr. 2, 1996

[54] FIRE PROTECTIVE FLEXIBLE COMPOSITE INSULATING SYSTEM

[75] Inventor: Vernon H. Wilson, Hudson, Wis.

[73] Assignee: Minnesota Mining and Manufacturing Company, Saint Paul, Minn.

[21] Appl. No.: 156,470

[22] Filed: Nov. 23, 1993

Related U.S. Application Data

[62] Division of Ser. No. 881,852, May 12, 1992, abandoned.

[51] Int. Cl.$^6$ ........................................................ E04B 1/00
[52] U.S. Cl. .................. 52/273; 52/396.01; 52/396.04; 52/573.1; 52/741.4
[58] Field of Search .............. 52/396.01, 741.4, 52/273, 396.04, 573.1

[56] References Cited

U.S. PATENT DOCUMENTS

| | | |
|---|---|---|
| Re. 24,908 | 12/1960 | Ulrich . |
| 3,916,057 | 10/1975 | Hatch et al. ........................ 428/236 |
| 4,256,799 | 3/1981 | Ohashi et al. ...................... 428/215 |
| 4,273,879 | 6/1981 | Langer et al. ...................... 521/91 |
| 4,305,992 | 12/1981 | Langer et al. ...................... 428/324 |
| 4,364,210 | 12/1982 | Fleming et al. .................... 52/220.8 |
| 4,433,732 | 2/1984 | Licht et al. ........................ 169/48 |
| 4,467,577 | 8/1984 | Licht .................................. 52/232 |
| 4,509,559 | 4/1985 | Cheetham et al. ................. 138/121 |
| 4,977,719 | 12/1990 | LaRoche et al. ................... 52/396.01 |

FOREIGN PATENT DOCUMENTS

| | | |
|---|---|---|
| 3632648C1 | 5/1982 | Germany . |
| 2250933A | 2/1990 | United Kingdom . |
| 89/09316 | 3/1989 | WIPO . |

OTHER PUBLICATIONS

Nicholas, John D., "Making Joint Systems Fire-Resistant", NFPA Journal, Mar./Apr. 1991, pp. 98–102.

3M Product Brochure 98-0701-2508-6 (1990) entitled "Planned Fire Protection from 3M".

Primary Examiner—Christopher W. Raimund
Attorney, Agent, or Firm—Gary L. Griswold; Walter N. Kirn; James J. Trussell

[57] ABSTRACT

Flexible composite materials which are suitable for use as fire barriers for either static or dynamic joints are cost effective and easy to install. In one preferred embodiment the flexible composite includes (a) a first layer material having first and second major surfaces, the first layer material including inorganic fibers and a binder in the form of a flexible mat; (b) a second layer material adhered to the first major surface of the first layer material, the second layer material consisting essentially of metal foil, the second layer material having a melting temperature of at least about 350° C.; and (c) a third layer adhered to the second major surface of the first layer material, the third layer material including an intumescent fire retardant composite material.

27 Claims, 10 Drawing Sheets

FIRE PROTECTIVE FLEXIBLE COMPOSITE INSULATING SYSTEM

This is a division of application Ser. No. 07/881,852 filed May 12, 1992, now abandoned.

FIELD OF THE INVENTION

This invention pertains to flexible composite materials suitable for use in deterring the spread of fire, smoke, and fumes as may happen in a fire in a multi-floor building.

BACKGROUND ART

Fire, smoke, and fumes in confined spaces, such as multi-floor buildings, can be extremely life threatening. Frequently, if fire originates in the space between a floor and ceiling of such a structure, the fire, and resultant smoke and fumes, will tend to spread to other open spaces in the building, especially to open spaces above the point of origin of the fire.

The reasons behind this spread of fire, smoke, and fumes to higher areas are varied. The areas between conduits, piping, and the like, and floors/ceilings through which they pass, are known as "through-penetrations". If not fire protected, through-penetrations offer areas of low resistance to fire, smoke, and fumes, and in essence serve as "chimneys". These areas may be filled with commercially available fire retardant and intumescent putties, caulks, wraps, or mats, known in the art as "firestops". Representative firestop products are disclosed in product brochure number 98-0701-3508-6 (published 1990) from Minnesota Mining and Manufacturing Company (3M). The 3M products are currently known under the trade designations "CP 25WB" "CP 25N/S" "CP 25S/L" and "Firedam" (caulks); "MPP-4S" and "MPS-2" (moldable putties); "FS-195" and "CS-195" (moldable strips); and "Interam" and "Interam E-5" (mats). These products are variously described in assignee's U.S. Pat. Nos. 3,916,057; 4,273,879; 4,305,992; 4,364,210; 4,433,732; and 4,467,577.

The above firestop products and others have been widely used for reducing or eliminating the chimney effect for through-penetrations and pass the rigorous American Society of Testing Materials (ASTM) fire endurance test (ASTM E-814) after intumescing and charring. However, even if the fire is contained in the space between one floor and the next highest floor by a firestop, serious hazards remain. This is because many multi-level buildings will have joints between exterior walls and floors constructed as illustrated in side elevation in FIG. 1. Shown is "vision" or "spandrel" (i.e., ornamental) glass 10, which may form the exterior of a building. (Alternatively, 10 may be concrete, marble, and the like.) Typically, an inorganic fibrous material 12 is installed for thermal insulation (referred to in the art as a "curtain wall"). The inorganic fibrous material may be glass fiber, mineral wool, and the like. Thermal insulation 12 is fastened to a "mullion" 13 (term of art for the metal frame system for the exterior glass and thermal insulation) with screws or other means as shown at 16 and 18. Also shown is a concrete floor slab 20 which is typically supported by an I-beam 22. A "safing" material 14 is also typically installed, which may be glass fiber, mineral wool, or other type of inorganic fibrous material insulation. One or more Z-clips 15 is typically provided for mechanically supporting safing 14.

It is important to note that an air space 24 is left in the construction illustrated in FIG. 1, between the mullion, thermal insulation, and the vision or spandrel glass (typically about 2.5 cm gap). As heat is generated in the interior of the building in the vicinity of such a wall/floor joint, if the temperature is high enough, the binder in mineral wool insulation will oxidize, exposing the air space 24 to fire, smoke, and fumes, and allow the chimney effect discussed above. (Glass fiber insulation will begin to disintegrate at about 565° C., causing similar problems.) Heat from the fire may then distort the mullion system, cause the concrete floor to deform, and may ultimately cause the vision or spandrel glass (or other exterior wall material) to shatter. Obviously, falling debris present a hazard to people outside of the building, such as fire control personnel and on-lookers, and fire hoses may be cut by falling glass chards and other debris. Thus, it would be highly advantageous to keep the temperature of the thermal insulation as low as possible, for all of these reasons.

As explained by Nicholas, J. D., in "Making Joint Systems Fire-Resistive" NFPA Journal, March/April (1991), pp. 98–102, at 100:

The crucial difference between joints [such as those illustrated in FIG. 1] and through-penetrations is movement. Firestops are designed for static applications because the movement of penetrating items, such as pipes, is normally absorbed by bellows joints and directed away from the firestop. Thus, the firestop remains relatively static. However, joints do move, responding to expansion, contraction, shear, and rotational joint movements caused by thermal variations, seismicity, settlement, and wind sway . . . If the fire barrier deteriorates, permanently deforms, or cannot cycle, it may not be able to maintain its fire rating. (Emphasis supplied)

Note that the terms "firestop" and "fire barrier" have different and precise meanings in the art, the former describing materials used in through-penetrations and other static joints, the latter used to denote materials used in movable (dynamic) joints.

There is thus a requirement for a flexible composite material which can be used in conjunction with conventional thermal insulation to form a system which provides not only adequate thermal insulation under static conditions, but which also provides the required fire barrier properties for dynamic joints such as illustrated in FIG. 1. The present invention is drawn toward meeting this need. Currently, as explained by Nicholas at page 100, there exists no fire endurance standards for fire barriers since standard tests have not been available.

U.S. Pat. No. 4,977,719 (LaRoche et al.) describes an expansion joint for interior or exterior use including a fire barrier comprised of a fire resistant inorganic refractory fabric sheet which supports resilient fire resistant inorganic refractory fibers. German patent application DE 3632648 (Figen et al.) describes a rain-proof and fire-resistant movable profile system for a freely movable connection of an available building wall, especially a wall of an older building, and a butt-jointing attachable exterior wall, consisting of three individual profiles which can be moved with respect to each other. Neither reference suggests the composites, systems, or methods of the present invention.

SUMMARY OF THE INVENTION

It has now been determined that wall/floor joints such as those illustrated in FIG. 1, and other "dynamic" (subject to movement) joints, may be brought into compliance with an equivalent of ASTM E-119 through their entire cycle of expansion and contraction. Certain preferred embodiments of the novel flexible composite materials and systems of this invention provide this long felt need. These preferred embodiments will not only pass the rigors of a fire endurance test comparable to ASTM E-119, but will also pass the hose stream test of this standard. Construction joints (static joints between two floor slabs) would also benefit from these constructions; however, as movement is not a problem in this type of joint, other preferred flexible composite materials and system embodiments within the invention will be sufficient to pass the E-119 test.

In its broadest embodiment, the invention comprises a flexible composite material suitable for use in static joints, the flexible composite comprising:

(a) a first layer of material having first and second major surfaces, the first layer material comprising inorganic fibers and a binder in the form of a flexible mat; and (b) a second layer material adhered to the first major surface of the first layer material, the second layer material consisting essentially of metal foil adhered to the first layer by an adhesive, the second layer material having a melting temperature of at least about 350° C. These flexible composite embodiments are suitable for use as a fire barrier in static conditions.

Preferably, when used as a fire barrier for dynamic joints, such as wall/floor joints experiencing thermal expansion/contraction cycling, the flexible composite material includes a third layer (c) adhered to the second major surface of the first layer material, the third layer material comprising a flexible intumescent fire retardant composite. This embodiment may also be used in static joints.

In all embodiments of the invention the inorganic fibers of the first layer are selected from the group consisting of alumina-silicate fibers, mineral wool fibers, glass fibers, and refractory filaments such as zirconia-silica fibers and crystalline alumina whiskers. Mixtures of these inorganic fibers are also usable within the invention. The first layer may optionally include up to about 65 weight percent (More preferably from about 40 to about 65 weight %) unexpanded vermiculite. Binders may be organic and/or inorganic.

An alternate embodiment of the flexible composite material of the invention, also suitable for use as a fire barrier for static joints, comprises:

(a) a first layer material having first and second major surfaces, the first layer material comprising inorganic fibers and a binder in the form of a flexible mat, as above described;

(b) a second layer material adhered to the first major surface of the first layer material, the second layer material comprising a flexible intumescent fire retardant composite material as above described;

(c) a third layer adhered to the second layer, the third layer comprising inorganic fibers which are the same or different than the first layer as above described; and (d) a fourth layer adhered to the third layer, the fourth layer comprising a flexible intumescent fire retardant composite material.

Another alternate embodiment of the flexible composite material of the invention suitable for use with static joints comprises:

(a) a first layer material having first and second major surfaces, the first layer material comprising inorganic fibers and a binder, formed as a flexible mat, as above described;

(b) second and third layers adhered to the first and second major surfaces of the first layer, respectively, the second and third layers comprising inorganic fibers which are different from those of the first layer;

(c) fourth and fifth layers adhered to the second and third layers, respectively, the fourth and fifth layers comprising a flexible intumescent fire retardant composite material.

Systems for thermally insulating and providing fire barrier properties for an exterior wall and/or an exterior wall/floor joint of a building are also presented. All systems of the invention are designed to be installed in buildings wherein the wall comprises mullion and exterior material, and wherein the floor comprises a material which is rigid at room temperatures but experiences deformation due to thermal expansion (especially at fire temperatures) and contraction, seismic activity, and the like.

The first preferred class of systems according to the invention may be described generally as "long" versions, since the fire barrier extends the entire length of the insulating component. This embodiment of the system comprises:

(a) an insulating component positioned substantially within the shape defined by the mullion upon attachment to the mullion and having interior and exterior facing surfaces, the insulating component comprising an inorganic material capable of providing thermal insulation for the building;

(b) a safing component positioned substantially between an exterior butt end of the floor and the insulating component; and (c) a fire barrier comprising a flexible composite material, the fire barrier having first and second portions, the first portion positioned adjacent and substantially parallel to the insulating component, and the second portion positioned substantially adjacent the safing component upper surface, the second portion having first and second ends, the first end attached to the top surface of the butt end of the floor and the second end attached to the first portion, and the first portion of the fire barrier attached to the mullion, wherein the second portion has at least one curved portion which provides slack, thus allowing the fire barrier to effectively lengthen and shorten during relative movement of the wall and floor.

A particularly preferred system of this class of systems is the system wherein the first portion of the fire barrier has an upper and a lower terminus and is positioned substantially adjacent and parallel to the interior facing surface of the insulating component. The lower terminus of the first portion is attached to the mullion in a fashion which completely covers the insulating component. The upper terminus of the first portion is attached to the second fire barrier portion. The upper terminus extends between the insulating and safing components in this embodiment. The second portion most importantly includes an S-shaped curved portion or like accumulation which is positioned substantially adjacent the upper surface of the safing; intumescent caulk is applied to seal the fire barrier to the insulation and to the safing, and the safing is supported by one or more Z-clips or similar clips. This system is particularly preferable as a retrofit or original installation when the insulating component is glass fiber. These "long" versions also prolong the life of the exterior glass or other material, as well as the mullion.

A second, less expensive class of systems for thermally insulating and providing fire barrier properties for dynamic exterior wall/floor joints of buildings is presented. In this class of systems (which may be described generally as "short" versions), the fire barrier is attached to that portion of the insulating component positioned above the safing, and is also attached to the floor. These systems comprise:

(a) an insulating component positioned substantially within the shape defined by the mullion upon attachment to the mullion and having interior and exterior facing surfaces, the insulating component comprising an inorganic material capable of providing thermal insulation for the building;

(b) a safing component positioned substantially between an exterior butt end of the floor and the insulating component; and (c) a fire barrier comprising a single length of flexible composite material, the fire barrier having first and second ends, the first end positioned substantially adjacent and fastened to the insulating component and mullion at a point no lower than the safing, the second end fastened to the top surface of the exterior butt end of the floor, wherein the flexible composite has at least one curved portion which provides slack to allow the fire barrier to effectively lengthen and shorten during relative movement between the floor and wall. These embodiments are advantageously used when the portion of the insulating component below the safing is mineral wool or other high temperature resistant material. The "short" fire barriers cannot be employed with glass fiber insulation installed below the safing since glass fiber insulation will begin to disintegrate at about 565° C., as previously mentioned. (The time-temperature curve of the ASTM E-119 test reaches temperatures of about 925° C.)

A method of making the three layer version of the flexible composite materials of the invention is also presented as another aspect of the invention. The method includes the steps of i) providing a laminate comprising a first layer comprising inorganic fibers and a binder formed into a mat, the first layer having on one major surface thereof a second layer consisting essentially of metal foil adhered to the first layer by an adhesive;

ii) coating an intumescent precursor solution comprising solvent and an intumescent fire retardant material onto the second major surface of the first layer to produce a wet coated composite material; and iii) exposing the wet coated composite material to conditions sufficient to cure the intumescent fire retardant material, thereby forming a flexible third layer comprising a the intumescent fire retardant material.

Preferably the solvent is water or an organic solvent, and the step of exposing the wet coated composite material to conditions sufficient to cure the intumescent fire retardant material is by the application of heat.

Methods of fireproofing a dynamic wall/joint with the long and short systems of the invention are also presented. In some methods, the insulation has been previously installed, for example, when an older building is to have a fire barrier installed. These are "retrofit" methods.

In one method of installing a long version of the system, insulating material is first positioned in the mullion. The flexible composite having three layers is then placed substantially adjacent and parallel to the surface of the insulation facing the interior of the building, securing the lower end of the composite to the mullion, being sure that the flexible composite completely covers the lower terminus of the insulation. With the intumescent fire retardant side of the composite facing toward the interior of the building, the composite is positioned between the insulation and safing, after which the composite is accumulated in an "S" shape (or the like) on top of the safing. The previously unfastened end of the composite is then fastened to the floor slab. Intumescent caulk is used to seal the composite to the safing and insulation, as described herein.

The three layer flexible composite materials of the invention, and long and short systems employing them, remedy a long felt need to both thermally insulate and provide fire barrier properties for dynamic wall/floor joints, joints which heretofore have provided chimneys for growing fires in multi-level buildings. The other flexible composite materials and systems of the invention provide new means to fireproof construction gaps.

Other advantages of the invention will become apparent from the detailed description which follows.

DESCRIPTION OF PREFERRED EMBODIMENTS

Figure 1:
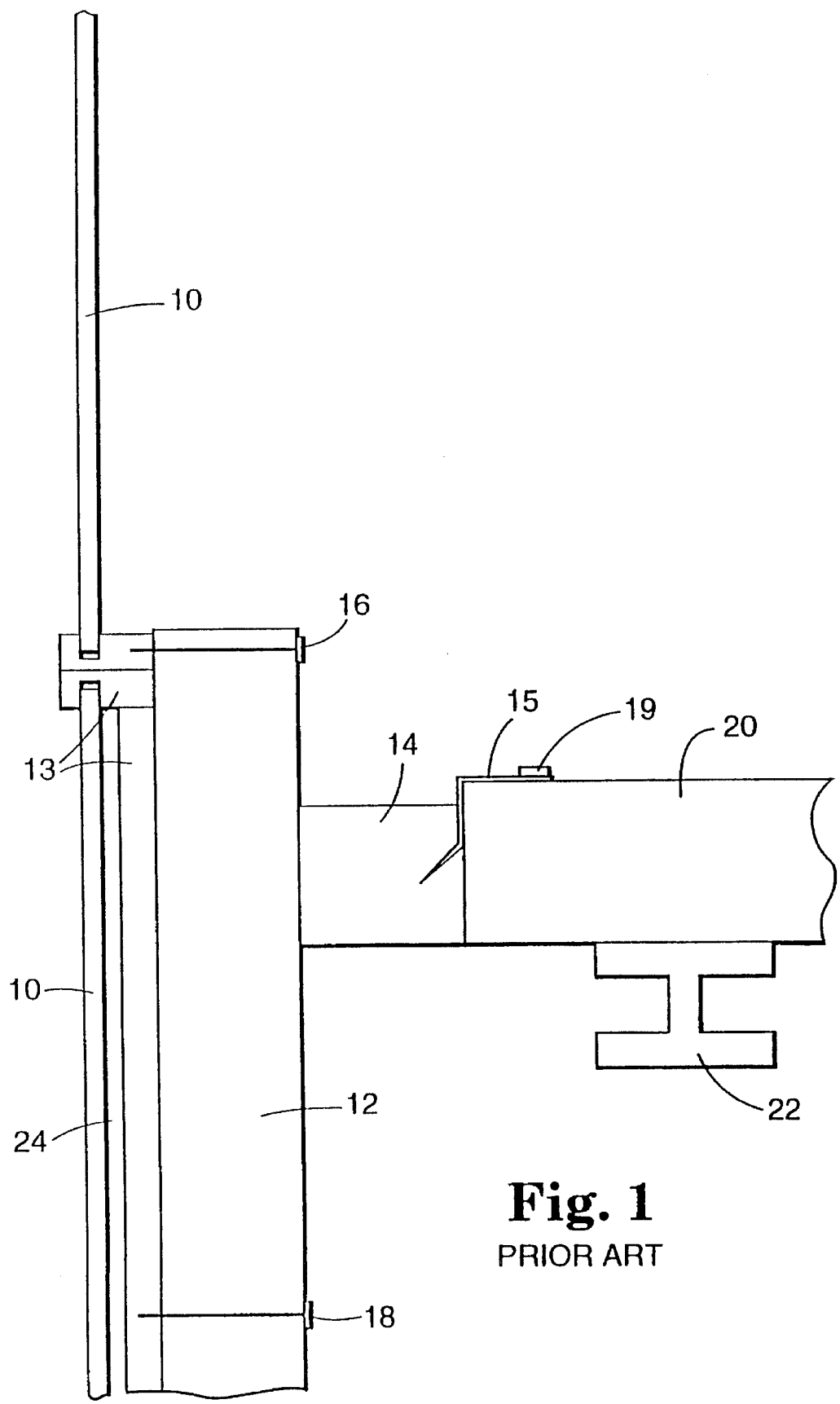
FIG. 1 shows a side elevation view of a prior art thermally insulated dynamic wall/floor joint.
Figure 2:
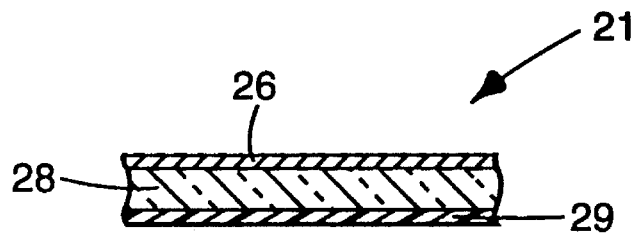
FIGS. 2 and 3 show cross-sectional views of two embodiments of flexible composite materials of the invention useful as fire barriers in dynamic and static joints, with layers exaggerated in thickness.
Figure 3:
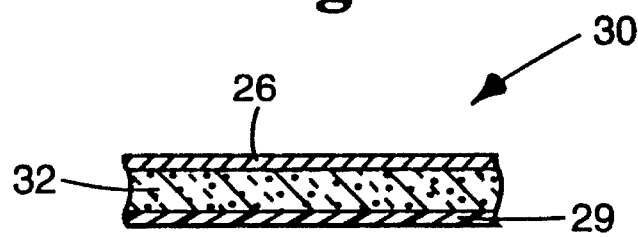

In order to meet the shortcomings in building standards for dynamic joints noted by Nicholas, above, I have invented the flexible composites of FIGS. 2 and 3. Thermal insulation (as shown in FIG. 1 at 12) is required by building codes for its thermal insulation and moisture barrier properties only. There are currently no codes or standards for fire barrier construction for dynamic joints because there has heretofore been no method to test dynamic joints for fire safety.

All flexible composite embodiments of the invention (except embodiment 40 of FIG. 4) utilize a flexible intumescent fire retardant composite layer or layers. The flexible intumescent fire retardant composite preferably comprises from about 15 to about 80 weight percent hydrated alkali metal silicate, from about 15 to about 40 weight percent of an organic binder, at most about 40 weight percent of an organic char-forming component, and at most about 50 weight percent filler. The organic binder may be formed from a binder precursor which is either thermally or radiation curable, or mixture of thermally and radiation curable binder precursors. Examples of typical and preferred intumescent fire retardant composites are disclosed in U.S. Pat. No. 4,273,879, which is expressly incorporated by reference herein. This composition is a flexible rubbery material in its unexpanded state, but once subjected to temperatures on the order of 110° C. and higher, intumesces up to 10 times it original volume and becomes a rigid char which is capable of sealing penetrations in which it is contained against the passage of smoke, vapors, and water. Other intumescent fire retardant materials may be used, such as those known under the trade designations "Palusol" (BASF) and "Expantrol" (3M).

The inorganic fiber layer preferably comprises up to 98 percent by weight of inorganic fibers, and from about 2 to about 20 weight percent organic and/or inorganic binder.

Useful inorganic fibrous materials include alumina-silicate fibers commercially available under the trade designations "Cerafiber" from Manville Corporation, "Kaowool" from Thermal Ceramics, and "Fiberfrax" from Carborundum Company, soft glass fibers commercially available under the trade designation "E-glass" from Manville Corporation, mineral wool, and refractory filaments such as zirconia-silica fibers and crystalline alumina whiskers. Suitable organic binders include rubber latices such as natural rubber, styrenebutadiene, butadiene-acrylonitrile, acrylates, an methacrylates. Suitable inorganic binders include bentonite and colloidal silica. Small amounts of surfactants, foaming agents, and flocculating agents may also be used if necessary.

A particularly preferred inorganic fiber layer useful in flexible composites of the invention is a mixture of 50 weight percent mineral wool and 50 weight percent alumina-silicate fibers, bound together at points of mutual contact by an acrylic latex binder. An example of a method of making such an inorganic fiber layer is presented as Example 1.

FIGS. 2 and 3 illustrate cross-sectional views of the flexible composites of the invention useful in systems of the invention for both dynamic and static joints. FIG. 2 shows a flexible composite 21 which includes a first layer 28 of inorganic fibers and binder, a second layer 26 of metal foil adhered to the first layer by a suitable adhesive, and a third layer 29 of a flexible intumescent fire retardant composite. Third layer 29 is partially intermingled between individual fibers of inorganic fiber layer 28 during a coating process (described below) and requires no adhesive to bond to the first layer.

The adhesive used to bond the metal foil layer 26 to the inorganic fiber layer 28 may be a pressure-sensitive adhesive or a thermoplastic material. For ease of processing, the metal foil and adhesive are preferably in the form of an aluminum foil/acrylic pressure-sensitive adhesive tape, such as that known under the trade designation "T-49" from 3M Preferred pressure-sensitive adhesives, because of their extended shelf life and resistance to detackifying under atmospheric conditions, are the acrylic-based copolymer adhesives, such as those disclosed in U.S. Pat. No. Re 24,906.

It may be preferable to use thermoplastic or thermosetting polymeric adhesives, for example, in environments where an acrylic-based adhesive might prematurely crack. Thermoplastic polymers useful and preferred as adhesives include polyethylene and polypropylene. Thermosetting polymeric adhesives which are useful and preferred include the reaction product of a diisocyanate (such as toluene diisocyanate {TDI} and the like) and a polyester. One example of this latter adhesive found useful in the present invention is available from Morton Chemical Company, Chicago, Ill., under the trade designation "Adcote".

Embodiment 30 of FIG. 3 is similar in all respects to embodiment 21 of FIG. 2, except that the first or middle layer 32 includes unexpanded vermiculite. Unexpanded vermiculite will expand to up to 10 times its original volume upon exposure to a temperature of about 300° C. As noted previously, unexpanded vermiculite comprises no more than about 65 weight percent of the total weight of layer 32.

Figure 4:
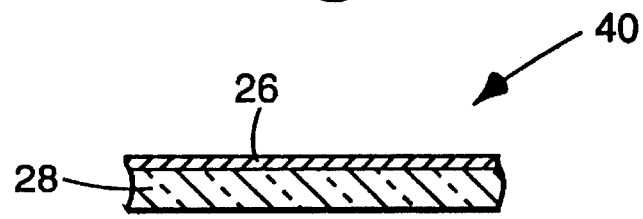
FIGS. 4–6 show cross-sectional views of three embodiments of flexible composite materials of the invention useful as fire barriers in static joints or in "short" systems for dynamic joints.

FIG. 4 illustrates in cross-section a flexible composite embodiment suitable for use as a fire barrier for static joints and may be used in "short" versions of the systems of the invention, as illustrated in FIGS. 10–14, and described further below. Illustrated is layer 28 of inorganic fibers and binder with a coating of metal foil 26 laminated thereto, as above described.

In embodiments 20, 30, and 40, the metal foil is preferably either aluminum or one of the stainless steels, such as type 304, and the like. The foil thickness may range from about 10 micrometers to about 200 micrometers, preferably from about 30 to about 70 micrometers. Thickness of metal foil may increased to provide a stronger flexible composite and for lessening the chance of breaking the inorganic fiber/foil laminate in the process of coating the intumescent fire retardant coating thereon. However, metal foils having thickness above about 200 micrometers significantly reduces the flexibility of the flexible composites, thus making the task of installation more difficult. Thicker foils are also not preferred from an economic standpoint.

Figure 5:
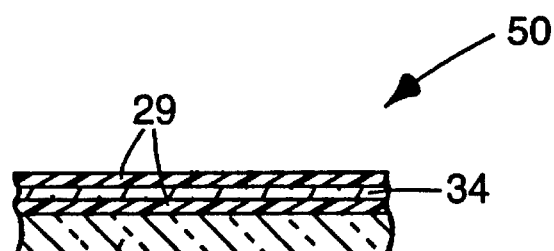
Figure 6:
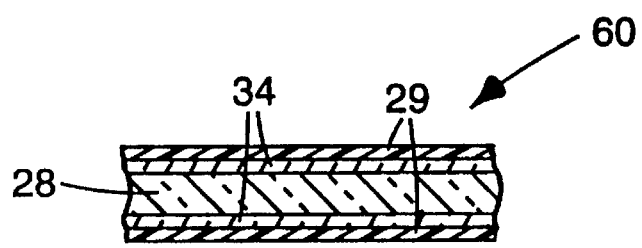

FIGS. 5 and 6 illustrate, again in cross-sectional views, flexible composites 50 and 60 in accordance with the present invention. Flexible composites 50 and 60 are suitable for use fire barriers for static and dynamic joints, but only the "short" embodiments of the latter (see discussion of FIGS. 10–14, below). Flexible composite 50 includes layer 28 of inorganic fibers and binder, as in the previous embodiments, and two layers 29 of flexible intumescent fire retardant composite. Between the two layers 29 is a layer 34 of inorganic fabric, which lends strength to the flexible composite. Flexible composite 60, illustrated in cross-section if FIG. 6, includes a layer 28 of inorganic fiber and binder, as in all embodiments, sandwiched between two layers 34 of inorganic fabric. Composite 60 is completed by having two layers 29 of flexible intumescent fire retardant composite material as the external layers. As with flexible composite 50, the inorganic fabric layers 34 increase the strength of the flexible composite so that the flexible composites withstand the hose stream test of ASTM E-119.

The inorganic fabric in embodiments 50 and 60 preferably comprises glass fiber.

Figure 7:
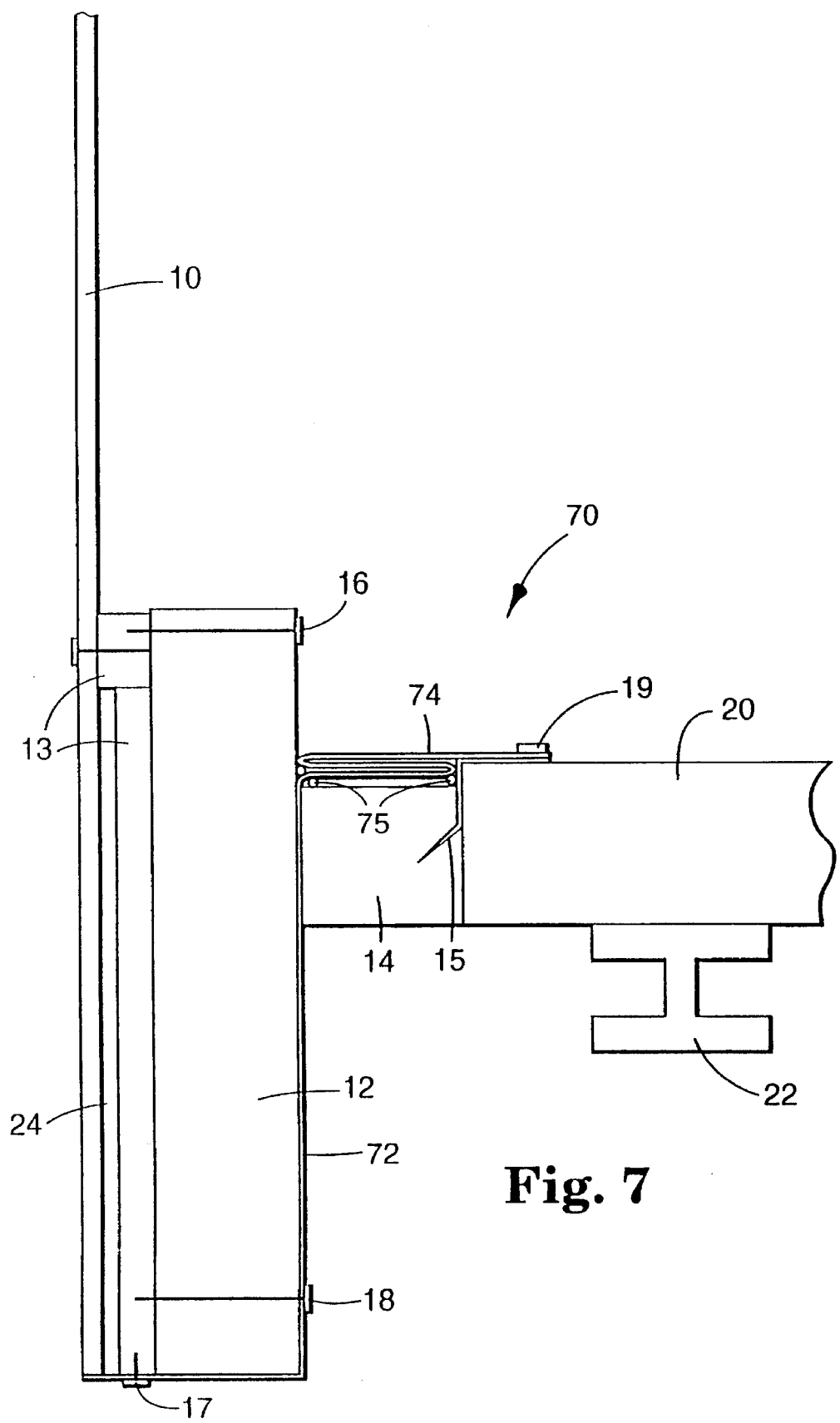
FIGS. 7–9 show side elevation views of three "long" embodiments of systems of the invention useful as fire barriers for dynamic joints.
Figure 8:
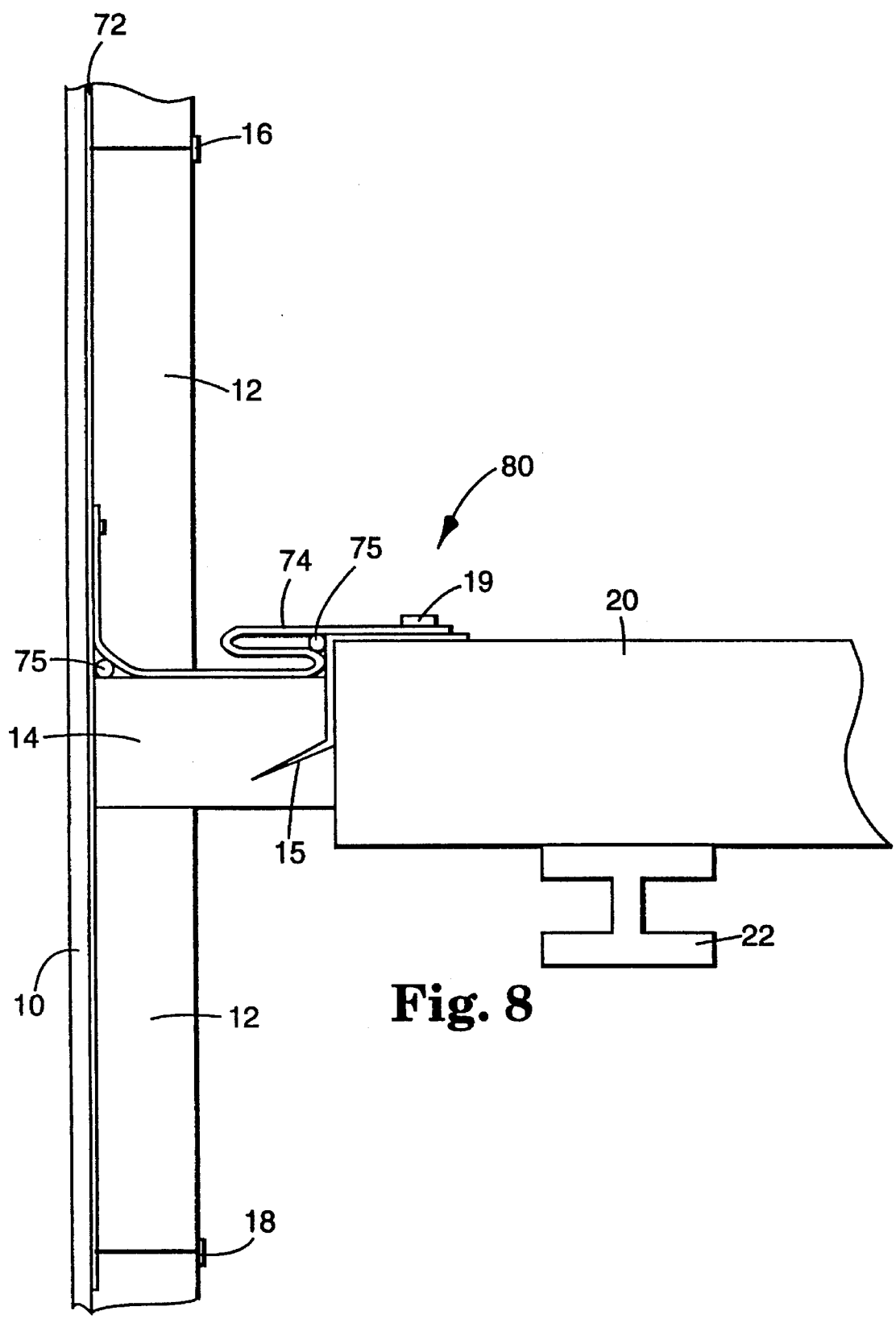
Figure 9:
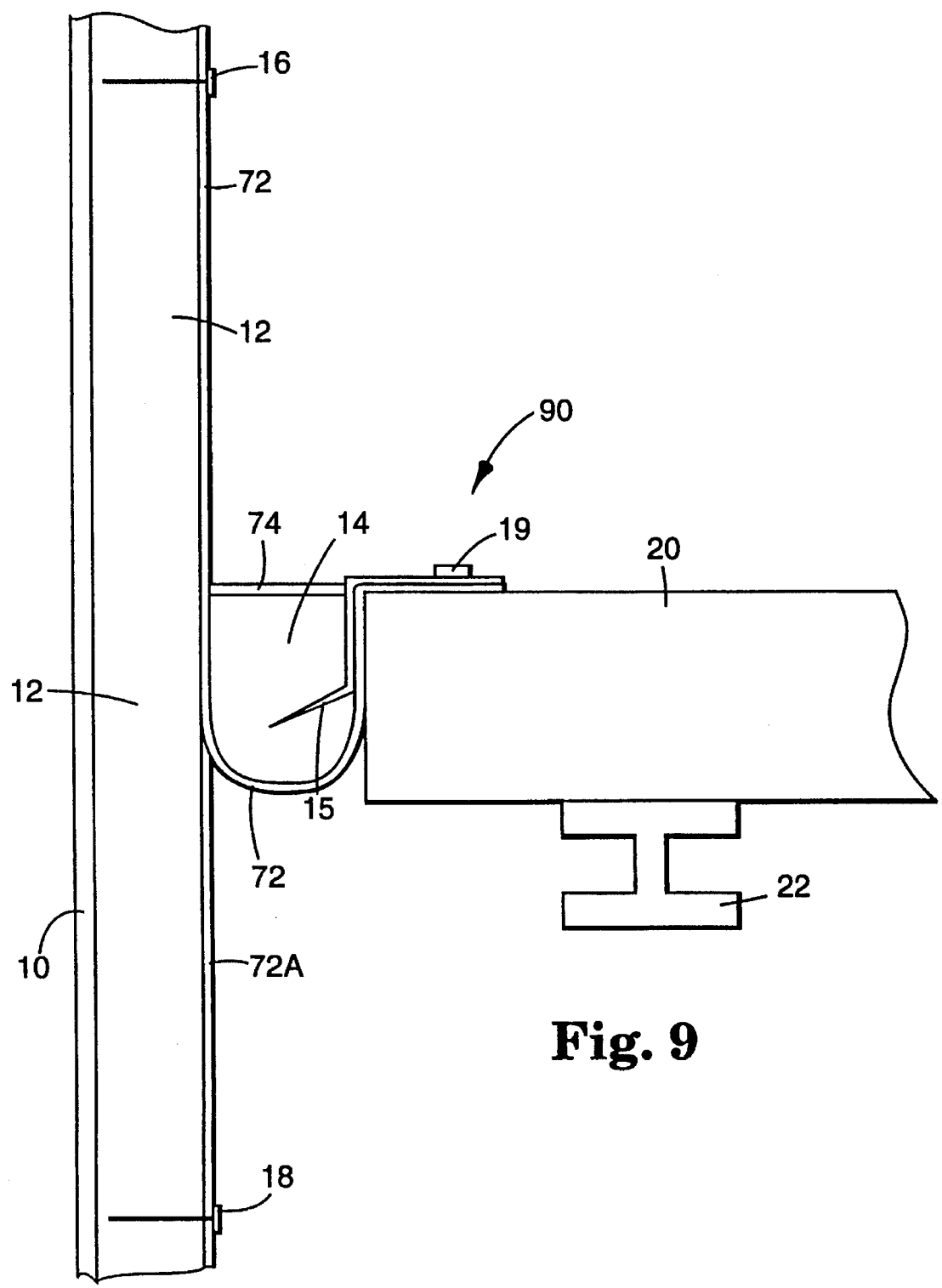

FIGS. 7–9 illustrate "long" systems of the invention. System embodiment 70 of FIG. 7 is one particularly preferred system of the invention. Either of the flexible composite embodiments 21 or 30 of FIGS. 2 and 3 may be used with this system to pass the time-temperature test utilized in ASTM E-119 and E-814 tests, or their equivalent (test described in Example 6. FIG. 7 shows essentially the same features as FIG. 1 with the addition of the flexible composite, denoted as having two portions 72 and 74. First portion 72 extends from mullion attachment pin 17 horizontally and then vertically past attachment pin 18, between the insulation 12 and safing 14. Second portion 74 of the flexible composite includes the "S" shaped portion which is accumulated over the upper surface of safing 14, being attached to floor 20 by attachment pin 19. It will of course be understood by those of skill in the art that a plurality of attachment pins 17, 18, and 19 may be required, and that configurations other than "S-shaped" accumulations of flexible composite may be employed.

Installation of the system shown in FIG. 7 may be either as a retrofit, wherein the thermal insulation 12 and safing 14 have been previously installed, for example, in an older building. Alternatively, the insulation, safing, and fire barrier may be installed as new construction. In either case, installation is simple and cost effective. The flexible composite 72 is first attached to the mullion 13 via pin 17. If the safing is already present, one must remove at least a portion of the safing to "thread" flexible composite 72 up to the next floor of the building. Thereafter safing 14 is inserted, and flexible composite portion 74 is accumulated over the safing, care being taken that the intumescent fire retardant side faces the interior of the building. It should be apparent to those skilled in the art that the terms "first" and "second" portions of the flexible composite do not mean that the flexible composite is necessarily in two separate pieces. As this embodiment illustrates, portions 72 and 74 are actually portions of a single flexible composite sheet.

Intumescent caulk 75 is placed where shown in FIG. 7 to provide additional fume and smoke barriers. Preferably, a flexible intumescent fire retardant caulk is used having composition similar to the intumescent fire retardant composite described previously. Caulks known under the trade designations "CP 25WB" "CP 25N/S" "CP 25S/L" and "Firedam" available from 3M, are particularly well suited for this purpose.

After caulk is in place the unattached end of flexible composite 74 is attached to the floor 20 via pin(s) 19.

The system shown in FIG. 8 as embodiment 80 of the invention is an alternative to the embodiment of FIG. 7. In embodiment 80, safing 14 extends from the butt end of the floor to the exterior glass, with thermal insulation 12 positioned above and below safing 14. In this system, all thermal insulation 12 can be glass fiber as long as safing 14 is mineral wool or similar high temperature resistant material. A first portion of flexible composite 72 of either FIGS. 2 or 3 is installed substantially parallel to the exterior glass of the building, intumescent side facing toward the exterior glass. A second portion 74 is attached to the first portion with caulk, as previously described, and accumulated over the upper surface of safing 14 and attached as illustrated to floor 20. In this embodiment, safing 14 is thus partially supported by Z-clip(s) 77 and by the lower thermal insulation panel 12.

As a fire develops in the vicinity of safing 14, underneath floor slab 20, if thermal insulation 12 is glass fiber it will eventually disintegrate as heat builds. However, the flexible intumescent layer of the first portion of flexible composite 72 will intumesce and fill the gap between the exterior glass and safing, thus ensuring that no fire, smoke, or fumes enter the space above floor 20. This is true even if the wall and floor deform since slack exists in flexible composite portion 74.

FIG. 9 shows another embodiment wherein the "long" flexible composite is used, again with either flexible composite embodiment of FIGS. 2 and 3. As with the embodiment shown in FIG. 7, thermal insulation 12 and safing 14 may in this case be either glass fiber or high temperature resistant mineral wool or the like. Flexible composite portion 72, beginning at attachment pin 16, is positioned substantially adjacent and parallel to thermal insulation 12, with metal foil facing the interior of the building. Portion 72 is installed so that it hangs down vertically until it reaches a point near the safing, where it is formed a "U" shape, and attached via pin 19 to floor 20. Note that this construction allows the intumescent material to face downward, toward the fire in the vicinity of the safing. Additionally fire barrier component 72A can be positioned against thermal insulation 12 and attached with attachment pin 18. A second portion of flexible composite 74 is accumulated over the upper surface of safing 14, as in FIGS. 7 and 8. For added support for safing 14, a Z-clip is preferably included in the construction as illustrated.

Figure 10:
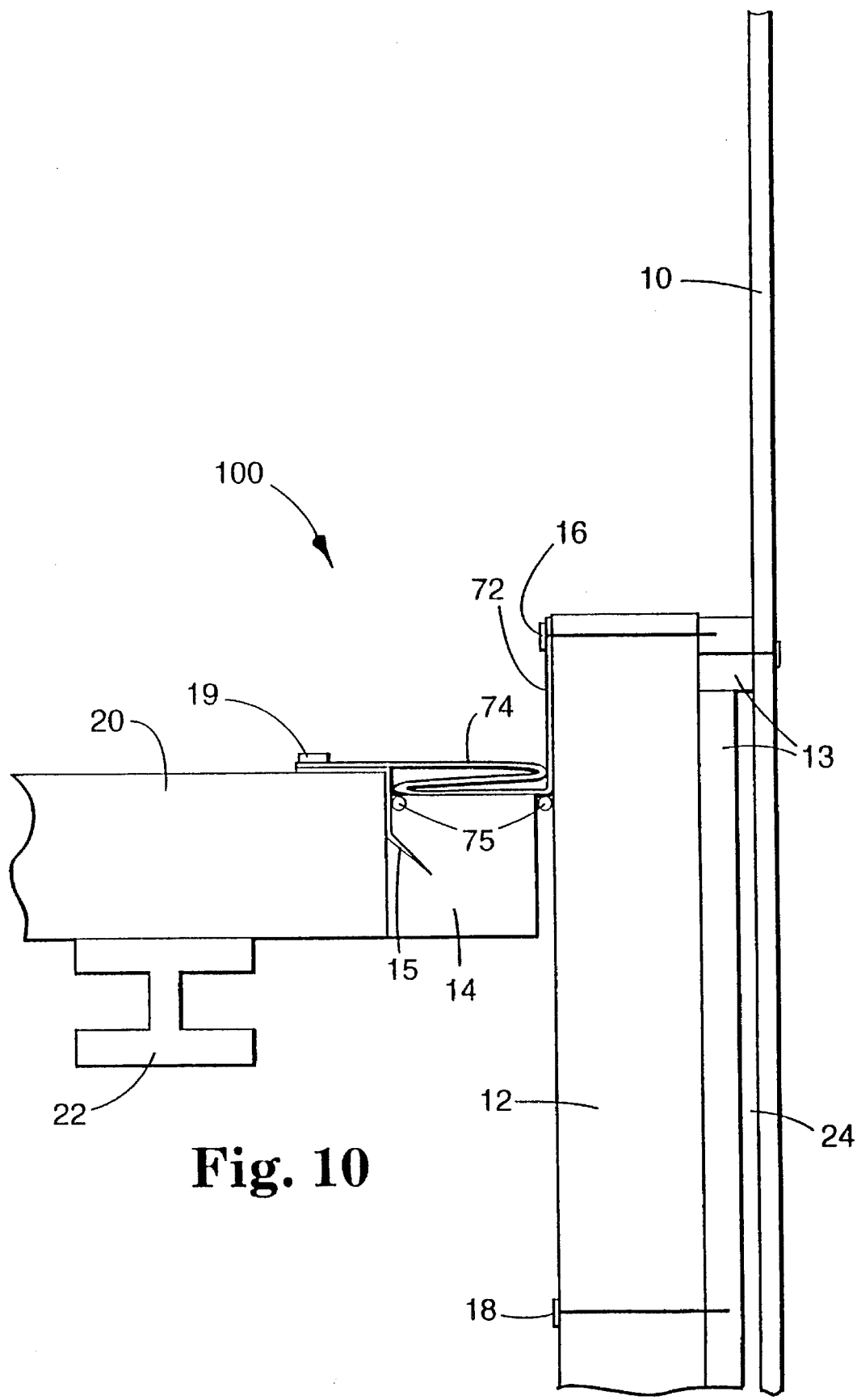
FIGS. 10–14 show side elevation views of five "short" embodiments of systems of the invention useful as fire barriers in dynamic joints.
Figure 11:
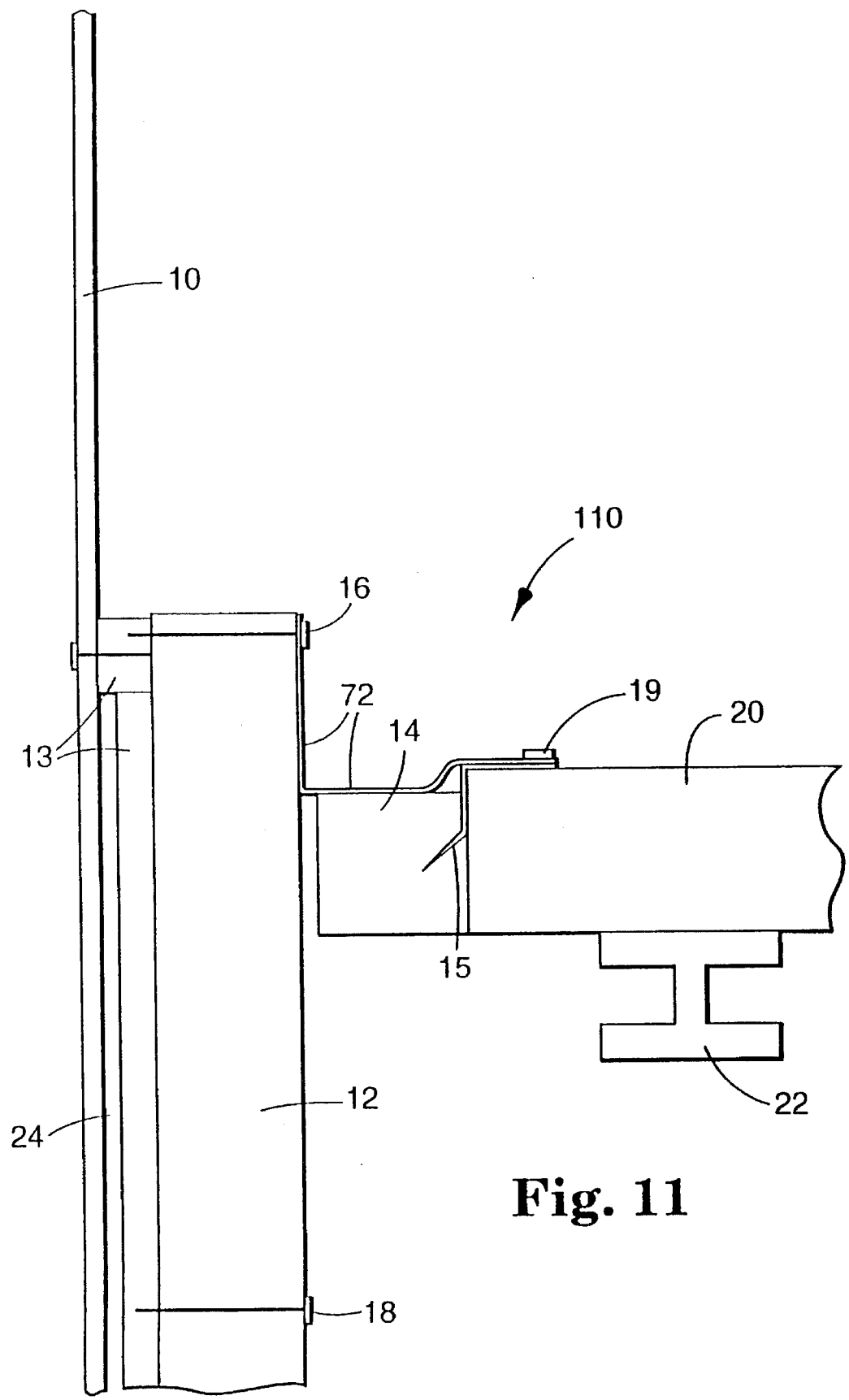
Figure 12:
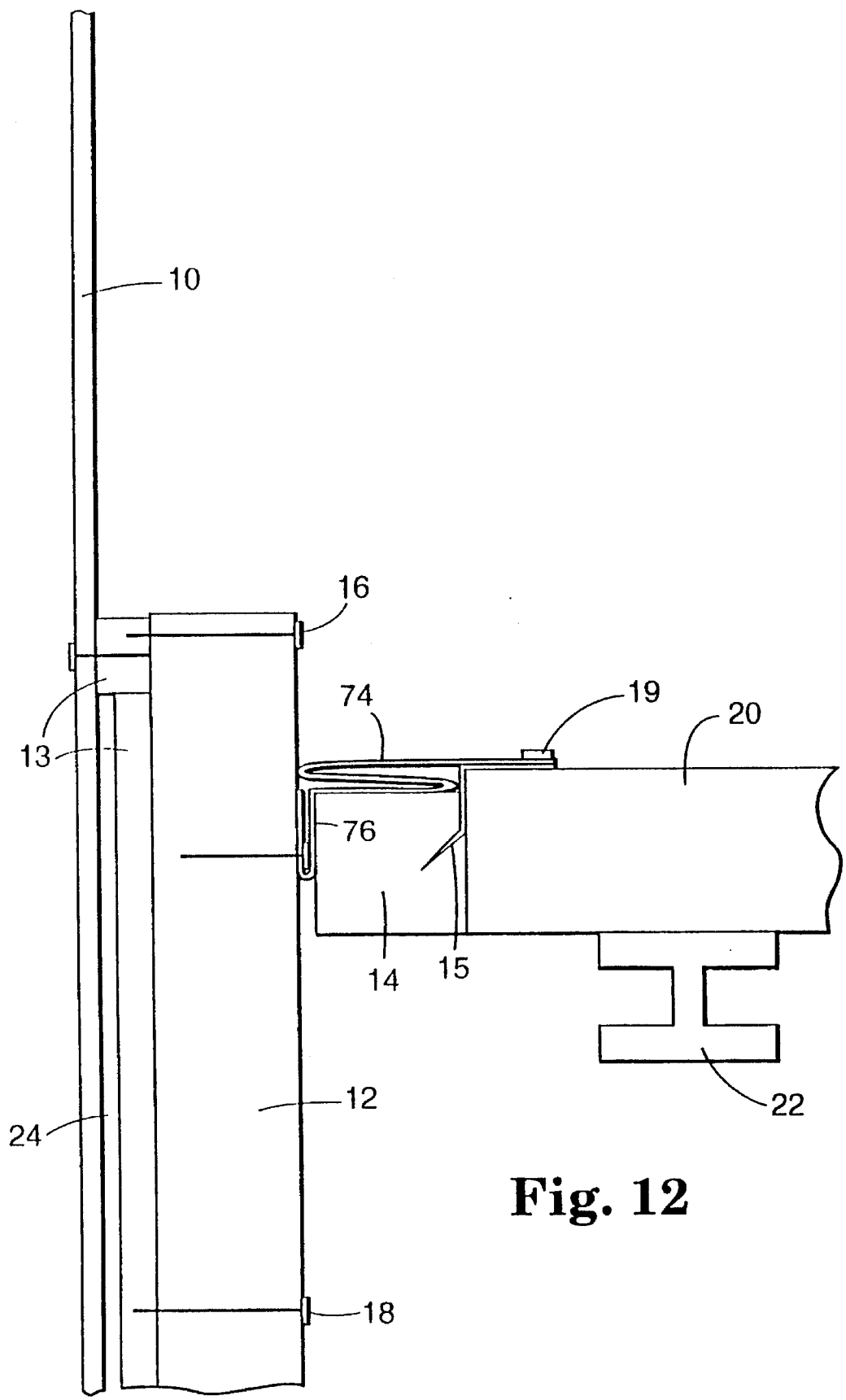
Figure 13:
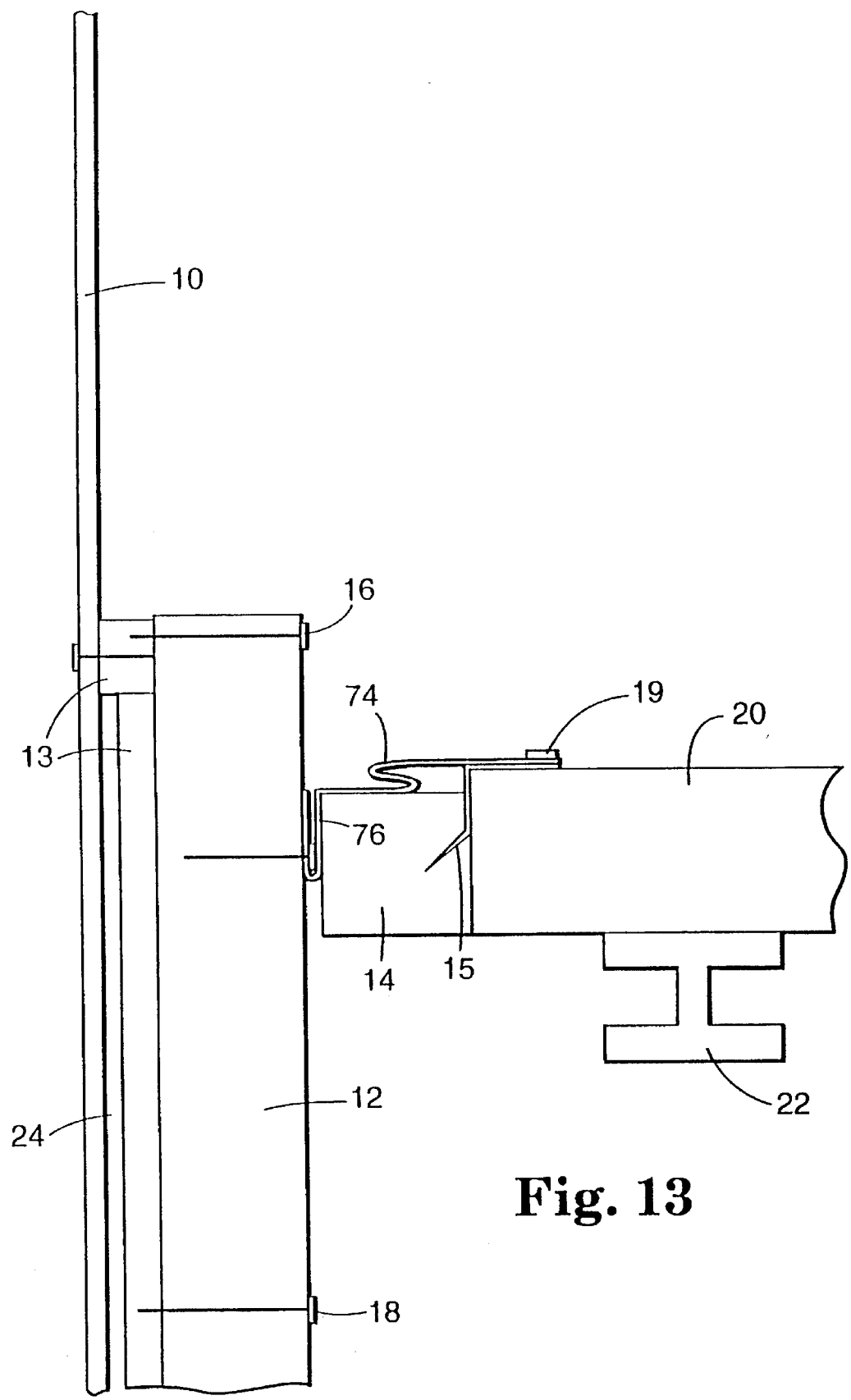
Figure 14:
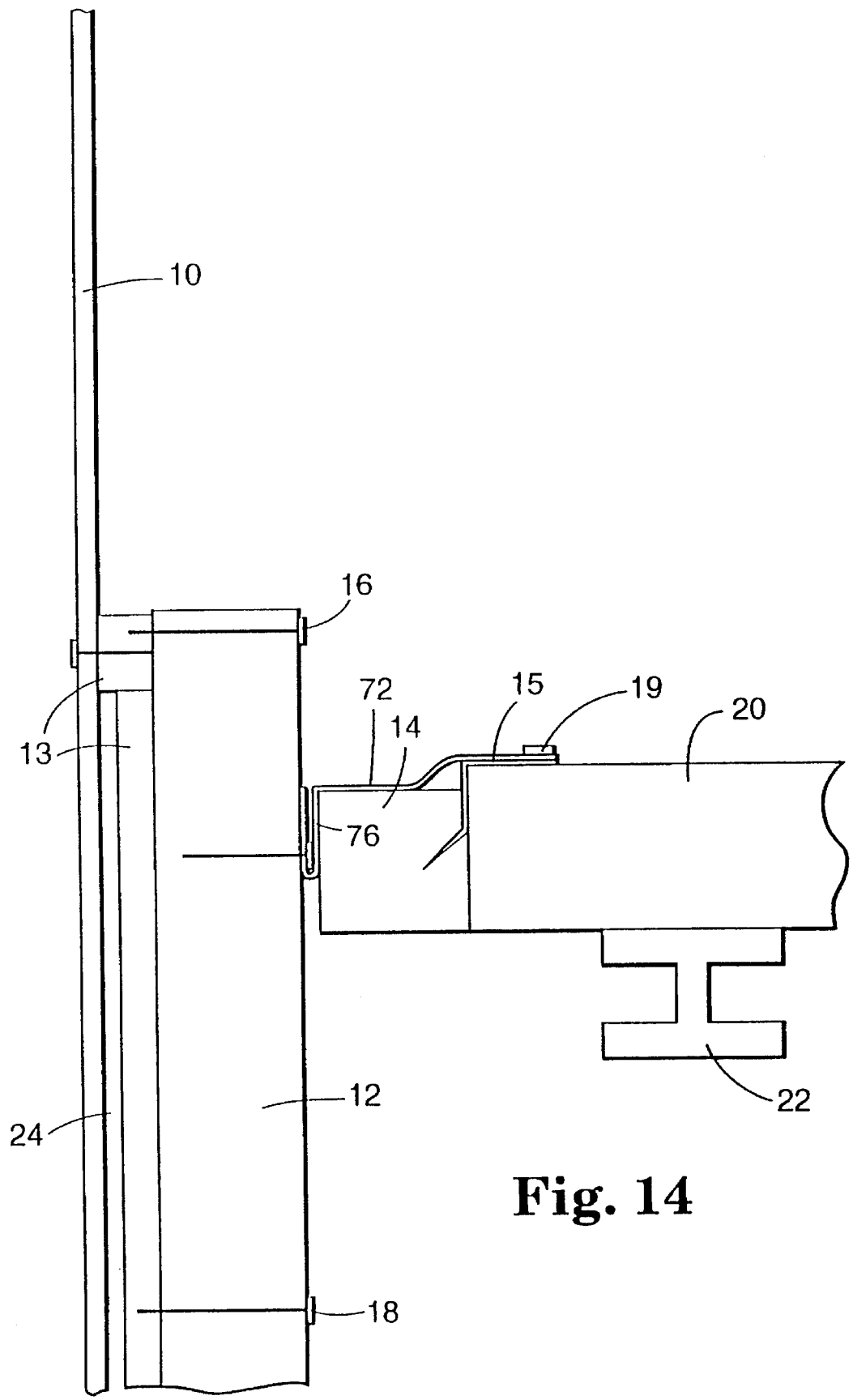

The five "short" system embodiments of the invention shown in FIGS. 10–14 may be used with either of the flexible composite embodiments of FIGS. 2 and 3, and only if the thermal insulation and safing are all high temperature materials, such as mineral wool, alumina-silicate, or refractory, as glass fiber insulation will not withstand fire temperatures. Numerical indications in FIGS. 10–14 are the same as for FIGS. 7–9. The systems shown in FIGS. 10 and 11 are especially suited for retrofit application, whereas the systems of FIGS. 12–14 require that the safing 14 be partially removed, or installed prior to installation of the safing. In each embodiment, the intumescent side of the flexible composites of FIGS. 2 and 3 faces the fire or hot side of the joint.

A method of making the three layer version of the flexible composite materials of the invention is also presented as another aspect of the invention. The method includes the steps of i) providing a laminate comprising inorganic fibers and a binder formed into a mat, the first layer having on one major surface thereof a second layer consisting essentially of metal foil adhered to the first layer by an adhesive;

ii) coating an intumescent precursor solution comprising solvent and an intumescent fire retardant material onto the second major surface of the first layer to produce a wet coated composite material; and iii) exposing the wet coated composite material to conditions sufficient to cure the intumescent fire retardant material, thereby forming a flexible third layer comprising a the intumescent fire retardant material.

Preferably the solvent is water or an organic solvent, the organic solvent selected from the group consisting of lower alkyl ketones (e.g. methyl ethyl ketone and the like), aromatic hydrocarbons (such as benzene, xylene, and the like), and other hydrocarbon solvents.

The method of making the laminate of step (i) is not within the scope of this invention, although an example is presented below which teaches how to make one preferred inorganic fiber/metal foil laminate useful in the flexible composites of the invention. Briefly, the inorganic fiber mat of the laminate is made using conventional paper making techniques, and an adhesive used to adhere the metal layer to the inorganic fiber layer. The adhesive may either be a pressure-sensitive adhesive or a thermoplastic. The latter may be preferred to prolong the life of the flexible composites of the invention, as many pressure-sensitive adhesives tend to become brittle with the passage of time.

After the inorganic fiber/metal foil laminate is produced, an intumescent precursor solution is coated onto the laminate on the side of the laminate not having foil. Coating of the intumescent precursor solution may be performed by any of a number of ways within the scope of the invention. Preferred methods use horizontal or vertical (tower) coating machines.

The preferred method of curing the intumescent fire retardant composite is by the application of heat, although the use of radiation curable organic binders alone or in combination with thermally curable binders may be preferred in certain circumstances.

When thermally curable binders are used to form the intumescent fire retardant composite, conventional roll, flow bar, and knife coating machines may be utilized to apply the intumescent precursor solution (comprising the intumescent fire retardant material and a solvent) to an exposed major surface of the inorganic fiber layer.

The number of drying ovens, temperature of the ovens, number of coats of precursor solution applied, and thickness of the individual coats may vary.

The method of the invention may be further understood with reference to the following examples, in which all parts and percentages are by weight unless otherwise stated.

EXAMPLES

Example 1: Production of an Inorganic Layer Comprising Mineral Wool and Alumina-silicate Fibers/Aluminum Foil Laminate The component ingredients and amounts used to make the preferred inorganic fiber layer/metal foil laminate are presented in Table 1. The mineral wool was first slushed in a pulper, charging about one half of the total weight of mineral wool (300 kg) and 12.7 kiloliters (kl) of water. This charge was slushed for 15 seconds, and subsequently pumped to a cyclone cleaner (known under the trade designation "Krebs"). The flow through the cyclone cleaner was adjusted to about 1 kl/min at 25 psig pressure. The two effluents ("accept" effluent and "reject" effluent) from the cyclone cleaner were inspected for shot and percent solids after the flow had stabilized through the accept effluent conduit using a 2.54 cm diameter orifice. The reject rate was about 5–10% of the weight of original mineral wool charge. The accept effluent was subsequently fed into a precipitation chest.

The above steps were repeated with the remaining mineral wool, with a proportionate amount of water.

After two batches of mineral wool reached the precipitation chest and tested for percent solids, all of the alumina-silicate fibers were fed to the pulper with 18.2 kl of water. The alumina-silicate fibers were slushed for 60 seconds in the pulper, and then pumped into the precipitation chest to form a slurry with the mineral wool.

TABLE 1

| Ingredient | Amount (kg or ml) |
| --- | --- |
| water | 47.3 |
| mineral wool (Bethleham) | 604 |
| alumina-silicate fibers ("Cerafiber", Manville Corporation) | 613 |
| sodium aluminate ("2372", Nalco Chemical) | 20.4 |
| 46% solids acrylic latex ("Rhoplex HA-8", Rohm & Haas) | 409 |
| defoaming agent ("Foammaster DF-160-LP,) | 0.91 ml |
| liquid alum | 50.9 ml |

The slurry of mineral wool fibers and alumina-silicate fibers was precipitated by first adding sodium aluminate with mixing until the pH of the slurry reached 8.0 or above. The acrylic latex, defoamer, and liquid alum were then added in order, with the pH of the slurry after addition of the liquid alum checked to be sure it was 6.5 or below. The slurry was then pumped to a machine chest.

The inorganic fiber layer was produced by a conventional wet lay paper technique, dried, and wound on a reel without a liner. After the basis weight of a wet 10.2 cm×15.2 cm sample of the web reached a target weight of about 20–25 gm, a flexible composite of the invention was made by forcing aluminum foil tape (known under the trade designation "T-49" having aluminum thickness of about 50 micrometers and a polyester/TDI adhesive into the nip at the reel, with the adhesive of the tape facing the top side of the inorganic fiber layer.

Example 2: Production of an Inorganic Layer Comprising 100% Alumina-silicate Fibers/Aluminum Foil Laminate A second laminate was formed in exactly the same manner as in Example 1, the only difference being the deletion of mineral wool.

Example 3: Production of Flexible Composite Using Example 1 Inorganic Layer and Water-based Intumescent Precursor Solution A length of 45.7 meters of 1.22 meter wide laminate of Example 1 was coated with an intumescent precursor solution comprising the ingredients listed in Table 2. The intumescent precursor solution was about 76% solids, and had a viscosity of about 24,000 centipoise, measured using a Brookfield viscometer, Model "RV" #4 spindel, 6 rpm, at about 20° C. This intumescent precursor solution was coatable and sprayable. The intumescent precursor solution was applied using a horizontal roll coater having three heating zones, with the first, second, and third, heating zones having temperatures of 120° C., 143° C., and 154° C., respectively. The intumescent precursor solution was applied having a dry coating weight of 2260 gm/m$^2$ (gsm). This coating was blistered.

TABLE 2

| Ingredients | Amount (parts) |
| --- | --- |
| polychloroprene latex | 8619 |
| antifoam agent ("Foamaster") | 49 |
| water | 49 |
| surfactant ("Triton X-100") | 203 |
| surfactant ("Tamol 850") | 203 |
| agerite | 101 |
| zinc oxide | 254 |
| iron oxide (FeO) | 254 |
| zinc borate/sodium silicate ("Expantrol 4B") | 4325 |
| aluminum hydroxide | 1524 |
| glass fibers | 509 |

Example 4: Production of Flexible Composite Using Example 2 Inorganic Layer and Water-based Intumescent Precursor Solution A length of 36.6 meters of 1.22 meter wide laminate of Example 2 was coated using intumescent precursor solution made in accordance with Example 3. The intumescent precursor solution was again applied with a horizontal roll coater, with the same heating zone temperatures as used in Example 3. This coating was also blistered.

Example 5: Production of Flexible Composite Using Example 2 Inorganic Layer and Organic Solvent-based Intumescent Precursor Solution A length of 265 meters of 1.22 meter wide laminate of Example 2 was coated with an intumescent precursor solution comprising the ingredients listed in Table 3.

TABLE 3

| Ingredient | Amount (parts) |
| --- | --- |
| xylene | 22.5 |
| methyl ethyl ketone | 22.5 |
| calcium carbonate | 16.6 |
| polychloroprene latex | 15.7 |
| sodium silicate | 9.3 |
| zinc borate | 1.8 |
| chlorinated olefins | 4.5 |
| 2-ethylhexyldiphenyl phosphate | 2.8 |
| water | 2.6 |

The intumescent precursor solution had a viscosity of 40,000 centipoise, measured using a Brookfield viscometer model "RV" #4 spindel, 6 rpm, at about 20° C. A horizontal roll coater was used, as in Examples 3 and 4. Using first, second, and third heating zone temperatures of 93° C., 99° C. and 107° C., respectively, and machine speed of 3 meters/min, the coating did not cure. The heating zone temperatures were then raised to 121° C., 143° C., and 154°

C., which produced cured coatings having coating weight (dry) of 1033 gsm. Blistered coatings were produced.

Example 6: Production of Flexible Composite Using Example 2 Inorganic Layer (Containing Vermiculite), and Organic Solvent-based Intumescent Precursor Solution As earlier disclosed, the inorganic fibrous layer used in the flexible composites of the invention may include vermiculite. This Example used a commercial mat available under the trade designation "Interam 2100", commercially available from 3M, which had aluminum foil adhesive tape (known under the trade designation "T-49") laminated thereto. This inorganic fibrous layer was essentially the same as that of Example 2, except the layer included about 50 weight percent cationically exchanged vermiculite, as disclosed in U.S. Pat. No. 4,305,992, which is incorporated by reference. The inorganic fibrous layer of this Example was coated with an intumescent precursor solution made in accordance with Example 5.

Comparative Example A

For comparison in the fire rating and hose stream tests (described below), a commercially available aluminum foil/mineral wool laminate (known under the trade designation "Thermafiber Life Safety System", from United States Gypsum Company) was employed as Comparative Example A.

In making the flexible composites of the invention in the above Examples 1–6, a horizontal roll coater was employed. A tower knife coater may also be employed. It has been found that in the case of a tower knife coater (wherein the inorganic fiber/metal foil laminate is threaded and pulled vertically through two serially arranged vertical heating zones, with one intumescent precursor solution coated onto the laminate in each zone), the first vertical heating zone temperature should generally be about 90° C. while the second vertical heating zone temperature is preferably about 110° C. These conditions are appropriate for coating an intumescent caulk known under the trade designation "CP 25N/S" (3M) diluted to 55% solids with methyl ethyl ketone, at wet thickness of 0.2 cm, pulling the laminate through the tower coater at a rate of about 55 meters/hr. Spray coating has also been evaluated for the water-based intumescent precursor solutions with some success.

In some of the flexible composites made by the above procedures (both in horizontal and tower coaters), blistering of the flexible intumescent coatings during heating occurred. This was believed due to the entrapment of solvent in bubbles as the composite passed through the heating zones of the dryers. Through suitable adjustment of speed through the zones, and/or lowering of the coating thickness, blistering was overcome. It was also noted that the location where the precursor slurry was pumped into the coating pan was where blistering seemed to occur most. The occurrence of blisters was substantially eliminated by judicious placement of the feed to the coating pan.

Another problem was splice failures. High tension was needed to pull the coated laminates through the ovens or heating zones. Splices made with high temperature adhesive on film backing, with long (60–90 cm) longitudinal strips on each side of the splice worked well; however, normal, short splices would fail midway through the heating zones, especially in vertical tower coaters. Even with a splice failure, however, splices could be remade in the oven without a significant loss of product. Starting and stopping the horizontal and tower coating processes was also performed quickly. The most effective splice tape found for this coating process was a 20.3 cm wide pressure-sensitive tape having a high temperature polyester/TDI thermoset adhesive.

Test Method

A test procedure was developed by the assignee of this invention so that systems comprising thermal insulation and the flexible composites of the invention could be evaluated in dynamic joints. The test was developed to simulate a "real world" fire in which the vertical wall and floor deform. Test "specimens" were constructed as shown in FIG. 7. Floor slab 20 was concrete and had thickness of 11.43 cm, while in place of spandrel glass 10, a 10.2 cm thick, vertical concrete slab was used. Two pieces of 5.1 cm×2.54 cm aluminum mullion were installed vertically, separated by 61 cm, with a 2.54 cm gap between the vertical concrete slab and mineral wool insulation, also of 10.2 cm thickness. The safing was 10.2 cm thick mineral wool. The flexible composite to be tested was installed as shown in FIG. 7, and the structure heated from below using time-temperature curves of ASTM tests E-119 and E-814. A thermocouple was placed near the "cold" side of the safing (near the thermal insulation) and the temperature recorded at 20 minute intervals. The results for Examples 2, 5, 6, and Comparative Example A are presented in Table 1.

Hose stream tests in accordance with ASTM E-119 and E-814 were also performed on the inventive Examples and Comparative Example A. The water spray was 6.1 meters from center, using 45 seconds sweep time and at 0.2 megaPascals water pressure. The results for the hose stream test (denoted "HS") are presented in Table 4 as "P" for "pass" and "F" for "fail".

TABLE 4

Results of Fire Test and Hose Stream Test

| | Temperature (°C.) at Time (min.) | | | | | | | | H |
|---|---|---|---|---|---|---|---|---|---|
| Example | 20 | 40 | 60 | 80 | 120 | 140 | 160 | 180 | S |
| 2 | 27 | 63 | 88 | 91 | 93 | 96 | 107 | 121 | P |
| 5 | 26 | 49 | 66 | 71 | 82 | 96 | 99 | 107 | P |
| 6 | 29 | 46 | 63 | 71 | 82 | 116 | 124 | 135 | P |
| A | 38 | 68 | 96 | 88 | 182 | 204 | 210 | 227 | F |

Whether a fire barrier passes the fire test is determined by noting the cold side temperature after 1 hour (ASTM E-814) and 2 hours (ASTM E-119). The cold side temperature should be below 163° C.+ambient temperature to pass ASTM E-814, and below 121° C.+ ambient temperature to pass ASTM E-119. As may be seen by the data in Table 4, even the aluminum foil/inorganic fibrous laminate of Example 2 would pass the fire rating test and hose stream test; however, since intumescent layer is not present in Example 2, there would still be a chimney for smoke and possibly toxic fumes. Note that the Comparative Example did not pass either the equivalent of the ASTM E-119 time-temperature test or the hose stream test.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A system for thermally insulating and fire-proofing an exterior wall and an exterior wall/floor joint of a building wherein the wall comprises mullion and exterior sheet material, and wherein the floor includes an exterior butt end facing the wall and wherein the floor comprises a material which is rigid at room temperatures but experiences sagging due to its weight at fire temperatures, the system for thermally insulating and fire-proofing the exterior wall and the exterior wall/floor joint comprising:

an insulating component, a sating component, and a fire barrier component, wherein:

(a) the insulating component is positioned substantially within the shape defined by the mullion upon attachment to the mullion and having interior and exterior facing surfaces, the insulating component comprising an inorganic material capable of providing thermal insulation for the building;

(b) the sating component is positioned substantially between the exterior butt end of the floor and the insulating component; and (c) the fire barrier component comprises a flexible composite sheet comprising:
  (i) a first layer having first and second major surfaces, the first layer comprising inorganic fibers and a binder in the form of a flexible mat; and
  (ii) a second layer adhered to the first major surface of the first layer, the second layer consisting essentially of metal foil adhered to the first layer by an adhesive, the second layer having a melting point of at least about 350° C.; and the fire barrier component having first and second portions, the first portion positioned adjacent and substantially parallel to the insulating component, and the second portion positioned substantially above the sating component in a curved fashion, the second portion having first and second ends, the first end attached to the top surface of the floor and the second end attached to the first portion, and the first portion of the fire barrier attached to the mullion, wherein the second portion has at least one curved portion which provides slack, thus allowing the fire barrier component to remain intact during relative movement of the wall and floor.

2. The system of claim 1 wherein the insulating component extends along the wall from a point below floor to a point above the floor, the first portion of the fire barrier component being attached to the mullion at a point below the floor and extending adjacent the interior facing surface of the insulating component, through the wall/floor joint between the insulating component and the sating component, and the second portion of the fire barrier component being positioned above the sating component in the form of an S-shaped curve, and wherein the sating component is held in position by one or more Z-clips.

3. The system of claim 1 wherein the flexible composite sheet further comprises a third layer adhered to the second major surface of the first layer, said third layer comprising an intumescent fire retardant composition.

4. The system of claim 3 wherein the inorganic fibers in the first layer of the fire barrier component are selected from the group consisting of alumina-silicate fibers, mineral wool fibers, glass fibers, zirconia-silicate fibers, crystalline alumina whiskers, and mixtures thereof.

5. The system of claim 3 wherein the first layer of the fire barrier component includes unexpanded vermiculite.

6. The system of claim 5 wherein the unexpanded vermiculite is present in the first layer of the fire barrier component at a weight percent ranging from about 40 to about 65 weight percent.

7. The system of claim 3 wherein said metal foil is selected from the group consisting of aluminum foil and stainless steel foil.

8. The system of claim 7 wherein said stainless steel foil is type 304 stainless steel foil.

9. The system of claim 3 wherein said intumescent fire retardant composition comprises from about 15 to about 80 weight percent hydrated alkali metal silicate, from about 15 to about 40 weight percent of an organic binder, up to about 40 weight percent of an organic char-forming component, and up to about 50 weight percent filler.

10. The system of claim 1 wherein the inorganic fibers in the first layer of the fire barrier component are selected from the group consisting of alumina-silicate fibers, mineral wool fibers, glass fibers, zirconia-silicate fibers, crystalline alumina whiskers, and mixtures thereof.

11. The system of claim 1 wherein the first layer of the fire barrier component includes unexpanded vermiculite.

12. The system of claim 11 wherein the unexpanded vermiculite is present in the first layer of the fire barrier component at a weight percent ranging from about 40 to about 65 weight percent.

13. The system of claim 1 wherein said metal foil is selected from the group consisting of aluminum foil and stainless steel foil.

14. The system of claim 13 wherein said stainless steel foil is type 304 stainless steel foil.

15. A system for thermally insulating and fire-proofing an exterior wall and an exterior wall/floor joint of a building, wherein the wall comprises mullion and exterior sheet material, and wherein the floor comprises a butt end remote from and facing the wall, the floor comprising a material which is rigid at room temperatures but experiences sagging due to its weight at fire temperatures, the system for thermally insulating and fire-proofing the exterior wall and the exterior wall/floor joint comprising:

an insulating component, a sating component, and a fire barrier component, and wherein:
  (a) the insulating component is positioned substantially within the shape defined by the mullion upon attachment to the mullion and having interior and exterior facing surfaces, the insulating component comprising an inorganic material capable of providing thermal insulation for the building;
  (b) the sating component is positioned substantially between the exterior butt end of the floor and the insulating component; and
  (c) the fire barrier component comprises a single length of a flexible composite sheet, said flexible composite sheet comprising:
    (i) a first layer having first and second major surfaces, the first layer comprising inorganic fibers and a binder in the form of a flexible mat; and
    (ii) a second layer adhered to the first major surface of the first layer, the second layer consisting essentially of metal foil adhered to the first layer by an adhesive, the second layer having a melting point of at least about 350° C., and wherein the fire barrier component includes first and second ends, the first end being positioned adjacent and fastened to the insulating component and mullion at a point no lower than the sating component, the second end being fastened to the top surface of the floor, wherein the flexible composite sheet has at least one curved portion which provides slack to allow the fire barrier component to remain intact during relative movement between the floor and wall.

16. The system of claim 15 wherein the flexible composite sheet further comprises a third layer adhered to the second major surface of the first layer, said third layer comprising an intumescent fire retardant composition.

17. The system of claim 16 wherein the inorganic fibers in the first layer of the fire barrier component are selected from the group consisting of alumina-silicate fibers, mineral wool fibers, glass fibers, zirconia-silicate fibers, crystalline alumina whiskers, and mixtures thereof.

18. The system of claim 16 wherein the first layer of the fire barrier component includes unexpanded vermiculite.

19. The system of claim 18 wherein the unexpanded vermiculite is present in the first layer of the fire barrier component at a weight percent ranging from about 40 to about 65 weight percent.

20. The system of claim 16 wherein said metal foil is selected from the group consisting of aluminum foil and stainless steel foil.

21. The system of claim 20 wherein said stainless steel foil is type 304 stainless steel foil.

22. The system of claim 16 wherein said intumescent fire retardant composition comprises from about 15 to about 80 weight percent hydrated alkali metal silicate, from about 15 to about 40 weight percent of an organic binder, up to about 40 weight percent of an organic char-forming component, and up to about 50 weight percent filler.

23. The system of claim 15 wherein the inorganic fibers in the first layer of the fire barrier component are selected from the group consisting of alumina-silicate fibers, mineral wool fibers, glass fibers, zirconia-silicate fibers, crystalline alumina whiskers, and mixtures thereof.

24. The system of claim 15 wherein the first layer of the fire barrier component includes unexpanded vermiculite.

25. The system of claim 24 wherein the unexpanded vermiculite is present in the first layer of the fire barrier component at a weight percent ranging from about 40 to about 65 weight percent.

26. The system of claim 15 wherein said metal foil is selected from the group consisting of aluminum foil and stainless steel foil.

27. The system of claim 26 wherein said stainless steel foil is type 304 stainless steel foil.

* * * * *

UNITED STATES PATENT AND TRADEMARK OFFICE
CERTIFICATE OF CORRECTION

PATENT NO.: 5,502,937

DATED: April 2, 1996

INVENTOR(S): Vernon H. Wilson

It is certified that error appears in the above-identified patent and that said Letters Patent is hereby corrected as shown below:

Col. 7, line 10, "an" should read --and--.
Col. 8, line 6, between "may" and "increased" insert --be--.
Col. 8, line 24, "if" should read --in--.
Col. 10, line 21, after "comprising" delete "a".
Col. 14, line 66, "sating" should read --safing--.
Col. 15, line 7, "sating" should read --safing--.
Col. 15, line 23, "sating" should read --safing--.
Col. 15, line 37, "sating" should read --safing--.
Col. 15, line 39, "sating" should read --safing--.
Col. 15, line 40, "sating" should read --safing--.
Col. 16, line 25, "sating" should read --safing--.
Col. 16, line 33, "sating" should read --safing--.
Col. 16, line 50, "sating" should read --safing--.

Signed and Sealed this

Twenty-fifth Day of February, 1997

Attest:

BRUCE LEHMAN

Attesting Officer

Commissioner of Patents and Trademarks